United States Patent Office

3,061,600
Patented Oct. 30, 1962

3,061,600
POLYMERIZATION OF ALPHA-OLEFINES
Carlo Longiave and Renato Castelli, Novara, Italy, assignors to Montecatini Società General per l'Industria Mineraria e Chimica, Milan, Italy, a corporation of Italy
No Drawing. Filed May 27, 1957, Ser. No. 661,612
Claims priority, application Italy May 28, 1956
11 Claims. (Cl. 260—93.7)

This invention relates to linear polymers of alpha-olefines containing a high proportion of amorphous polymers.

The copending applications of G. Natta et al. Serial Nos. 514,097, 514,098 and 514,099 disclose the production of new high molecular weight, linear, regular head-to-tail polymers of alpha-olefines of the formula $CH_2=CHR$ in which R is a hydrocarbon radical containing from 1 to 8 carbon atoms, by polymerizing the monomeric alpha-olefine with the aid of a catalyst obtained by reacting a compound of a transition metal of groups IV to VI of the periodic table, e.g., titanium or vanadium, with an organometallic compound of a metal of the 2d or 3d groups of the periodic table, e.g. a metal alkyl such as triethyl aluminum.

The crude polymerizate obtained by polymerizing the higher alpha-olefins in contact with said catalysts is, as shown by Natta et al. normally a mixture of sterically differentiated macromolecules which are linear, regular head-to-tail macromolecules but which have different structures. In one of the different types of macromolecules shown to exist in the crude polymerizate, the asymmetric carbon atoms in adjacent units derived from the monomer and which make up the macromolecules show, for long sections of the chain, the same steric configuration, and the polymer has a strong tendency to crystallize. In the macromolecules of this type, and presuming the main chain to be fully extended in a plane, the $CH_3$ groups attached to the asymmetric carbon atoms lie on one side of the plane of the main chain and the H atoms attached to said carbon atoms lie on the opposite side of the plane. A chain section in which the $CH_3$ groups lie on one side of the plane, e.g., above the plane may be followed by a chain section in which the $CH_3$ groups lie on the opposite side of the plane, e.g., below the plane. In another type, the macromolecules have a regular, linear, head-to-tail structure but the asymmetric carbon atoms in the monomeric units forming the macromolecules do not have the same steric configuration and the polymer is inherently amorphous and does not tend to crystallize.

These two types of macromolecules, which have different solubility characteristics, can be separated by fractional dissolution.

The differences in the properties of the macromolecules, including the crystallizability, are not due to differences in molecular weight, but to the differences in structure described above. The term "isotactic" was first proposed by one of us, G. Natta, to define the new crystallizable macromolecules having substantially isotactic structure, and polymers of the alpha-olefines made up of such macromolecules, and has since been adopted by the art. The amorphous macromolecules, and polymers made up thereof have been defined as "non-isotactic" or "atactic" macromolecules and polymers.

The two different types of polymers, crystallizable and amorphous, having different structures and solubilities also exhibit other differences in their physical properties and are adapted to different applications and uses. For example, the crystallizable polymers are fiber-forming, while the amorphous non-crystallizable polymers find important use in the field of elastomers.

The proportion of crystallizable to amorphous polymers in the crude polymerizate normally varies, depending on several factors, including the particular alpha-olefine which is polymerized, the conditions of the polymerization including the specific catalyst used, the dispersibility thereof in the inert hydrocarbon solvent in which the polymerization is carried out, and so on.

In the pending application of G. Natta et al., Ser. No. 550,164, methods for steering the polymerization, at will, to the production of either the crystallizable polymers or the amorphous polymers are disclosed. For example, it is disclosed that the use of a catalyst which is crystalline and difficultly dispersible in the inert hydrocarbon orients the polymerization to the production of crystallizable polymers whereas the use of a catalyst of the type described and which is amorphous and soluble or readily dispersible in the inert hydrocarbon favors the production of polymers which are predominantly to exclusively amorphous. It is further disclosed that if the catalyst obtained by reacting the transition metal compound and the metal alkyl in the inert hydrocarbon comprises portions which are difficultly dispersible in the inert hydrocarbon and portions which are readily dispersible therein, the reaction product can be filtered through a filter having fine pores to obtain a suspension containing mycellae of catalyst of very small size and which favor the production of the amorphous polymer.

It may not always be desirable to use the earlier method of orienting the polymerization to the production of the amorphous polymers. It presents some technical problems or, for optimum results, requires the use of relatively expensive chemicals such as the use of alcoholates of the transition metal or of aluminum alkyls in which the alkyl radical contains a large number of carbon atoms. Also, the crude polymerizate may contain undesirably large amounts of liquid (oily), low molecular weight polymers.

The primary object of this invention is to provide a new and improved method for orienting the polymerization of the alpha-olefines to the production of amorphous polymers, which method has certain practical advantages over the method previously disclosed and discussed above.

This and other objects are accomplished by the present invention in accordance with which it is found that the production of the amorphous polymers is favored by effecting the polymerization with a catalyst of the kind described above but in the presence of an anhydrous finely divided, solid material which is chemically inert to the catalyst. The polymerizate obtained is a substantially linear, regular head-to-tail product but contains a much higher proportion of amorphous polymer than does a polymerizate produced with the same catalyst but in the absence of the finely divided, anhydrous inert substance. This increase in the amorphous polymer content of the crude polymerizate produced according to the present method is obtained with the alpha-olefines generally, but is particularly noticeable in the case of butene-1.

The exact percentage of amorphous polymer in the crude polymerizate we obtain depends on the inert anhydrous material used, the amount thereof present during the polymerization, and, to a lesser extent, on the particle size thereof. The explanation for the influence of the inert material on the type of macromolecule produced and the orientation of the polymerization to the production of the amorphous macromolecules, has not been fully elucidated as yet. However, the effect is pronounced and reproducible.

It is possible, by the present method and under conditions as illustrated in the examples below, to obtain polymerizates of the alpha-olefines which contain very small proportions (e.g. only 10%) of crystallizable macromolecules as determined roentgenographically, without favoring at all the production of low molecular weight, oily polymers, or increasing the proportion of such oily polymers over the proportion thereof normally present in the polymerizate.

Various anhydrous, inert materials can be used in the present method to inhibit the production of crystallizable macromolecules without increasing the proportion of oily, low molecular weight polymers. Preferably, the material selected for use in the anhydrous, finely divided condition is water-soluble so that it can be removed from the polymer by simply washing the latter with water. It is found that anhydrous inorganic salts which are water-soluble and chemically inert to the catalyst are convenient to use for accomplishing our objectives.

A number of such inorganic salts can be used. Alkali metal halides are particularly suitable, but the alkali metal sulphates, as well as water-soluble salts of other metals, are also effective. Excluded are carbonates, nitrates and phosphates, apparently because of reactions which take place between those salts and the catalyst. In fact, we find that when the last-mentioned salts are used, polymerization of the alpha-olefine does not take place or occurs only to a very limited extent.

The invention is not limited to the use of metal halides or sulphates. Other materials which are inert to the catalyst can be used. Among such useful materials, we mention particularly diatomaceous earth, Carborundum and finely ground quartz. Such materials, while inert to the catalyst and useful for increasing the proportion of the amorphous macromolecules produced, are not preferred however, since it is less convenient to separate them from the polymerizate at the completion of the reaction.

The amount of the inert material used to inhibit the production of the crystallizable macromolecules, and thereby increase the amount of amorphous macromolecules produced, may vary. Even small amounts are effective, such as 20% by weight based on the weight of the transition metal, e.g., titanium or vanadium, compound used in preparing the catalyst. By increasing the amount of the inert finely divided material there is obtained a large increase in the proportion of amorphous macromolecules, up to a maximum for an amount of the inert material corresponding to about 500% by weight based on the weight of the transition metal compound. Above that ratio, no further increase in the content of amorphous macromolecules is obtained, in practice. Expressed another way, the useful amount of the inert material is from 0.1 to 10 parts by weight thereof per part by weight of the transition metal halide.

The influence exerted by the particle size of the inert material is moderate. However, it is observed, that with the finest inert material (i.e. that having the smallest practically obtainable particle size) slightly higher proportions of the amorphous macromolecules are produced, the amounts of the inert material used being equal. The inert material may have a particle size between 10 and 1000 microns.

An important and fundamental feature of this invention is our finding that, using the anhydrous, finely divided, chemically inert solid to inhibit production of the crystallizable macromolecules and influence the polymerization to the production of the amorphous macromolecules, the molecular weight of the individual fractions of the polymerizate (crystallizable and amorphous, respectively) is not reduced as compared to the normal molecular weight of those fractions produced in the absence of the finely divided inert solid. The only effect of these materials which is observable is the decrease in the crystallizable polymer fraction of the crude polymerizate and the increase in the amorphous fraction content. Since the molecular weight of the amorphous macromolecules is, in general, lower than that of the crystallizable macromolecules, the overall average molecular weight of the crude polymerizate of the present process is lower than when the content of crystallizable fraction is high. The molecular weight is high, nonetheless, above 1000, and may be as high as 50,000 or even higher.

The following examples are given to illustrate the invention, it being understood that these examples are not intended to be limiting.

*Example 1*

A suspension of 0.1 mol of titanium trichloride and 2.0 gms. of finely ground anhydrous sodium chloride in 750 cc. of completely anhydrous benzene is placed in a 3-liter autoclave provided with a stirrer and with a circulating oil heating jacket. 0.20 mol of aluminum triethyl is added, with stirring, and finally there are added 755 g. of butene containing 66.2% of butene-1. The mass is heated to 70° C. and maintained at that temperature for 12 hours while stirring at a rate of 90 r.p.m. About 150 cc. of butanol are then introduced into the autoclave to decompose the catalyst and stop the reaction. After cooling, the autoclave is opened, the polybutene solution is withdrawn, and the polymer is precipitated by adding methanol to the solution. The precipitate is washed with water to remove the sodium chloride, ground, and dried at 50° C. for 10 hours. 465 g. of polymer are obtained; conversion 92.8%.

The amorphous polybutene-1, which is soluble in ether, amounts to 32% of the total polymer produced. It has an intrinsic viscosity of 0.26 (in tetralin at 135° C.). The residue of the ether extraction (68%) is 80% crystalline and has an intrinsic viscosity of 1.44.

*Example 2*

The process is carried out under the same conditions as in the preceding example, but in the presence of 10 g. NaCl. 404 g. of polymer, with a conversion of 83.7% are obtained from 757 g. of a butene mixture containing 68.8% of butene-1. The ether extract of the crude polymer (51.5%) is amorphous and has intrinsic viscosity of 1.22.

*Example 3*

The process is carried out under the same condition as in the foregoing examples, but in the presence of 20 g. NaCl. 450 g. of polymer (conversion 87.3%) are obtained from 788 g. of butene (containing 65.5% of butene-1). The polybutene thus prepared contains 54.2% of the amorphous polymer which is extractable with ether and has an intrinsic viscosity of 0.25. The residue (48.8%) is 80% crystalline and has an intrinsic viscosity of 1.18.

*Example 4*

0.075 mol of $TiCl_3$ in 750 ml. benzene and 10 g. NaCl are placed into the autoclave used in the foregoing examples. After adding 0.225 mol of triisobutyl aluminum while stirring, 775 g. of a butene mixture, containing 59.8% of butene-1, are then introduced. After 12 hrs. stirring at 60° C., the catalyst is decomposed with butanol and 410 g. of polybutene (conversion 80.3%) are isolated by the usual procedures. By extraction with ether, an amorphous fraction (39.3% of the total) is obtained having an intrinsic viscosity of 1.66, while the residue (60.7%) has an intrinsic viscosity of 2.48 and a crystalline content of 45%, as determined roentgenographically.

*Example 5*

Proceeding as in Example 4, but in the presence of 50 g. NaCl, 478 g. of polymer are obtained, from 850 g. butene having a 68.8% content of butene-1 (conversion 82%). The amorphous portion which forms 51.8% by weight of the polymer and has an intrinsic viscosity of 1.58, is extracted with ether. The residual 48.2% has an intrinsic viscosity of 2.41 and a 40% content of crystalline matter.

*Example 6*

A suspension of 0.075 mol of $TiCl_3$ and 30 g. of finely ground $K_2SO_4$, in 750 cc. n-heptane, is introduced into an autoclave as in the foregoing examples. 0.15 mol of triisobutyl aluminum and 752 g. butene (63% of butene-1) are added. After stirring for 12 hours at 70° C., 407 g. of polymer are obtained, with an 85.8% conversion. This polybutene contains 40.5% of an amorphous fraction, which is soluble in ether and has an intrinsic viscosity of 1.43, while the residue (59.5% of the total) has an intrinsic viscosity of 2.39 and a 40% content of crystalline polymer.

*Example 7*

Operating with an autoclave as in the other examples a catalyst is prepared by mixing 0.075 mol of $TiCl_3$, 10 g. KI and 0.225 mol of triisobutyl aluminum in 750 cc. benzene. 750 g. butene (55.4% of butene-1) are introduced. After 11 hours of reaction at 70° C., 336 g. of polymer are obtained with a conversion of 81%. The amorphous portion, solution in ether, constitutes 35.4% of the product and has an intrinsic viscosity of 1.38. The residue (64.6%) has an intrinsic viscosity of 1.98, and a content of 40% crystalline polymer.

*Example 8*

In an autoclave as in the foregoing examples, a run is made in which the catalyst is made from a mixture of 0.075 mol of $TiCl_3$, 50 g. of perfectly dry diatomaceous earth, and 0.225 mol of triisobutyl aluminum. The mixture is diluted with 750 cc. of benzene and 706 g. of a butene mixture (59.4% of butene-1) are added. 376 g. of polymer are obtained, with a conversion of 89.7%. The amorphous portion, soluble in ether, comprises 46.9% of the product and has an intrinsic viscosity of 2.60. The crude polymerizate has a crystalline polymer content of 45%, as determined under the X-rays.

*Example 9*

The autoclave used in the foregoing examples is charged with 0.0225 mol $TiCl_3$ in 750 ml. n-heptane, and 1.05 g. $NiSO_4$. After adding 0.0675 mol triethyl aluminum whilst stirring, 500 g. of a butene mixture containing 50.3% of alpha-butene are introduced. After 10¼ hours of stirring at 70° C., the catalyst is decomposed with butanol, and 181 g. polybutene are isolated by the procedures described in the foregoing examples (conversion 63.5%). By extraction with ether an amorphous fraction (43.8% of the total) is obtained, having an intrinsic viscosity of 0.83, while the residue (56.2%) has an intrinsic viscosity of 2.51 and a content of crystalline polymer of 65%, as determined roentgenographically.

For purposes of comparison, Example 1 above was repeated, except that the anhydrous inert finely divided material was omitted. The run was carried out using 0.1 mol $TiCl_3$ in 750 cc. perfectly anhydrous benzene
0.20 mol aluminum triethyl
717 g. of butene containing 66.2% butene-1 the mass being heated at 70° C. for 12 hours with continued stirring at a rate of 90 r.p.m. The polymerizate was recovered as in Example 1. 415 g. of polymerizate (conversion 87.5%) was obtained. By extracting the polymerizate with ether a fraction corresponding to only 26.5% of the total weight was obtained. It was found to be completely amorphous and to have an intrinsic viscosity of 0.23, determined in tetralin at 135° C. The extraction residue, corresponding to 73.3% by weight of the total, had an intrinsic viscosity of 1.29 and was about 80% crystallizable. In contrast, as shown in the examples, the proportion of amorphous polymer in the polymerizate obtained by the present method is not less than 30%.

As will be noted, the proportion of amorphous polymer in the crude polymerizate is always higher when the polymerization is performed in the presence of the anhydrous finely divided, chemically inert solid which may be regarded both as an "amorphous polymer promoter" or a "crystalline polymer inhibitor."

As has been stated, the catalyst used in polymerizing the alpha-olefines in accordance with the present method is a reaction product of a compound of a transition metal of groups IV to VI of the periodic table and an alkyl compound of a metal of the 2nd or 3rd group of the periodic table.

It is a decided advantage that the readily available, comparatively inexpensive halides of the transition metals and metal alkyls containing short-chain alkyl groups can be used in making the catalyst for use in this method without fractionation of the reaction product to obtain a catalyst of specific characteristics.

As the transition metal compound there may be used a halide, e.g. a chloride, of such metals as titanium, zirconium, halfnium, thorium, vanadium, molybdenum, chromium, tantalum, niobium, tungsten or uranium.

The metal alkyl may be an alkyl compound of the metal in which the alkyl radicals have a low number (1–4) of carbon atoms, such as the alkylated compounds of beryllium, magnesium, zinc, cadmium and other elements of the 2nd group, as well as aluminum and other elements of the 3rd group, e.g. triethyl aluminum.

The catalyst is prepared by reaction of the respective components in an inert hydrocarbon, which may be the monomer to be polymerized, or a solvent such as n-heptane, iso-octane, a light gasoline fraction free of olefinic bonds, or anhydrous benzene.

A suitable molar ratio of the transition metal halide to the metal alkyl is 1:1 to 1:10, usually preferably 1:1 to 1:6.

Polymerization of the alpha-olefine with the aid of these catalysts, and in the presence of the finely divided solid material which is chemically inert to the catalyst and polymer may be carried out at temperatures between 50° C. and 100° C. at normal atmospheric pressure or at somewhat increased pressure, e.g., at a pressure between normal atmospheric and 30 atmospheres.

The present method has the great advantage that the proportion of amorphous linear regular head-to-tail polymeric alpha-olefine obtained is increased without the need for selection of the more expensive transition metal compounds such as alcoholates, or of organometallic compounds of the metals of the 2nd or 3rd group of the periodic table containing long-chain alkyl or alkoxy groups, as the catalyst-forming components, and without regard to the physical state of the catalyst, i.e., whether it is crystalline or amorphous, or its dispersibility in the inert hydrocarbon, i.e. whether it is difficultly or easily dispersible therein. This simplifies the production of the polymers and eliminates technical difficulties incidental to fractionation of the reaction product of the catalyst-forming components, as well as reducing the cost of producing the catalyst. We may use the initial reaction product of the halide of the transition metal compound and the metal alkyl even though it comprises portions difficultly dispersible in the hydrocarbon as well as portions readily dispersible therein, and still obtain a polymerizate comprising a substantial proportion of the amorphous polymers.

The alpha-olefines polymerized in accordance with the present method have the formula

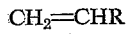

in which R is a saturated aliphatic, an alicyclic or an aromatic radical of from 1 to 8 carbon atoms. This includes propylene, butene-1, pentene-1, hexene-1, styrene, etc.

Some changes may be made in practicing this invention without departing from the spirit and scope thereof. It is to be understood, therefore, that it is intended to claim as part of the invention, such variations and modifications as lie within the scope of the invention and of the appended claims, and intended to include within the scope of said claims such changes as may be apparent to those skilled in this art in the practice of the principles of the invention as set forth in this specification.

What is claimed is:

1. In the polymerization of butene-1 in contact with a catalyst prepared by (1) starting with substantially solid, crystalline titanium trichloride and (2) mixing the trichloride with an aluminum trialkyl wherein the alkyl groups contain from 1 to 4 carbon atoms, which catalysts normally result in butene-1 polymerizates comprising some oily, low molecular weight 1-polybutenes, some higher molecular weight amorphous 1-polybutenes, and crystallizable 1-polybutenes, the improvement which comprises orienting the polymerization to the preferential production of amorphous 1-polybutene by carrying out the polymerization of the butene-1 in contact with said catalyst in a system containing an anhydrous, finely divided solid selected from the group consisting of water-soluble inorganic halides, water-soluble inorganic sulfates, Carborundum, diatomaceous earth and finely divided quartz, having a particle size between 10 microns and 1000 microns and which is chemically inert to the catalyst and to butene-1.

2. The method according to claim 1, characterized in that the catalyst is prepared from titanium trichloride and triisobutyl aluminum.

3. The method according to claim 1, characterized in that the catalyst is prepared from titanium trichloride and triethyl aluminum.

4. The process according to claim 1, characterized in that the anhydrous finely divided solid is an alkali metal halide which is chemically inert to the catalyst.

5. The process according to claim 1, characterized in that the anhydrous finely divided solid in an alkali metal sulfate which is chemically inert to the catalyst.

6. The process according to claim 1, characterized in that the anhydrous finely divided solid is used in an amount ranging from 0.1 to 10 parts by weight thereof per part by weight of the transition metal halide.

7. The process according to claim 1, characterized in that the anhydrous finely divided solid is anhydrous potassium sulfate.

8. The process according to claim 1, characterized in that the anhydrous finely divided solid is anhydrous potassium iodide.

9. The process according to claim 1, characterized in that the anhydrous finely divided solid is anhydrous nickel sulfate.

10. The process according to claim 1, characterized in that the anhydrous finely divided solid is anhydrous diatomaceous earth.

11. In the polymerization of butene-1 in contact with a catalyst prepared by (1) starting with titanium trichloride and (2) mixing the trichloride with triethyl aluminum, which catalyst normally results in a polybutene-1 consisting essentially of isotactic, crystallizable polybutene-1, the improvement which comprises carrying out the polymerization of the butene-1 with said catalyst in a system containing finely divided sodium chloride having a particle size between 10 and 1000 microns, to thereby produce a polymerizate containing from about 30% to at least 90% of amorphous polybutene-1, as determined roentgenographically.

References Cited in the file of this patent

UNITED STATES PATENTS

| | | |
|---|---|---|
| 2,824,089 | Peters et al. | Feb. 18, 1958 |
| 2,840,551 | Field et al. | June 24, 1958 |
| 2,881,156 | Pilar et al. | Apr. 7, 1959 |
| 2,893,984 | Seelbach et al. | July 7, 1959 |
| 2,899,413 | Hagemeyer et al. | Aug. 11, 1959 |
| 2,981,725 | Luft et al. | Apr. 25, 1961 |
| 3,008,943 | Guyer | Nov. 14, 1961 |

FOREIGN PATENTS

| | | |
|---|---|---|
| 534,792 | Belgium | Jan. 31, 1955 |
| 526,101 | Italy | May 14, 1955 |